United States Patent
Christiansson

[19]

[11] Patent Number: 5,829,356
[45] Date of Patent: Nov. 3, 1998

[54] SWITCHING DEVICE FOR USE IN SUSPENDED CONVEYORS

[76] Inventor: Carsten Christiansson, Sörmarksgatan 133, Borås, Sweden, S-502 49

[21] Appl. No.: 717,621

[22] Filed: Sep. 23, 1996

[51] Int. Cl.[6] .................................................. B61B 13/00
[52] U.S. Cl. ............................................. 104/167; 104/96
[58] Field of Search ............................ 104/167, 96, 103; 198/467.1, 625, 660

[56] References Cited

U.S. PATENT DOCUMENTS

| | | | |
|---|---|---|---|
| 1,298,285 | 3/1919 | Bogaty | 104/167 |
| 3,866,538 | 2/1975 | Forsey, Jr. | 104/167 |
| 4,615,274 | 10/1986 | Hoehn | 104/167 |
| 4,676,362 | 6/1987 | Malzkorn | 104/167 |
| 4,875,416 | 10/1989 | Duce | 104/167 |

FOREIGN PATENT DOCUMENTS 8000559  4/1980  WIPO .

OTHER PUBLICATIONS

Derwent Abstract No. 87–169058/24 of SU 1266774 of Tsarev et al. (1987).

*Primary Examiner*—S. Joseph Morano
*Attorney, Agent, or Firm*—Oppedahl & Larson

[57] ABSTRACT

Suspended conveyor systems frequently employ threaded spindles as the drive mechanism to transport trolleys within a track. The spindle cooperates with drive blocks positioned adjacent to wheels on the trolleys. To facilitate switching and turning of the trolleys with two sets of wheels, a modified spindle system is employed which has alternating threaded and non-threaded regions. The spacing of the threaded and non-threaded regions corresponds to the spacing between the sets of wheels on the trolley.

21 Claims, 5 Drawing Sheets

SWITCHING DEVICE FOR USE IN SUSPENDED CONVEYORS

This application is a continuation of International Application No. PCT/SE95/00304 filed Mar. 23, 1995 designating the United States.

BACKGROUND OF THE INVENTION

The invention refers to a suspended conveyor of the type incorporating at least one trolley movably arranged in an overhead beam system and having suspended load bearing means. The movable trolley in one embodiment is driven by a threaded spindle, which extends in the direction of travel and is adapted to cooperate with a driven part of the trolley. Such a conveyor provides a number of advantages, the most important of which might be that very little available floor space will have to be utilized for the conveyor.

A problem is however that such conveyor tracks can be arranged in one main direction, and branchings, curve portions, etc, require often manual actuation, whereby the automation will suffer.

SUMMARY OF THE INVENTION

The purpose of the present invention is now to provide a device in suspended conveyors, by which automatic switching into side tracks, running in sharp curves and even disengagement of separate movable trolleys from propulsion can be obtained without problems, and this has been achieved by means of the features defined in the accompanying claims.

Hereinafter the invention will be further described with reference to an embodiment schematically shown in the accompanying drawings.

DETAILED DESCRIPTION OF THE INVENTION

Figure 1:
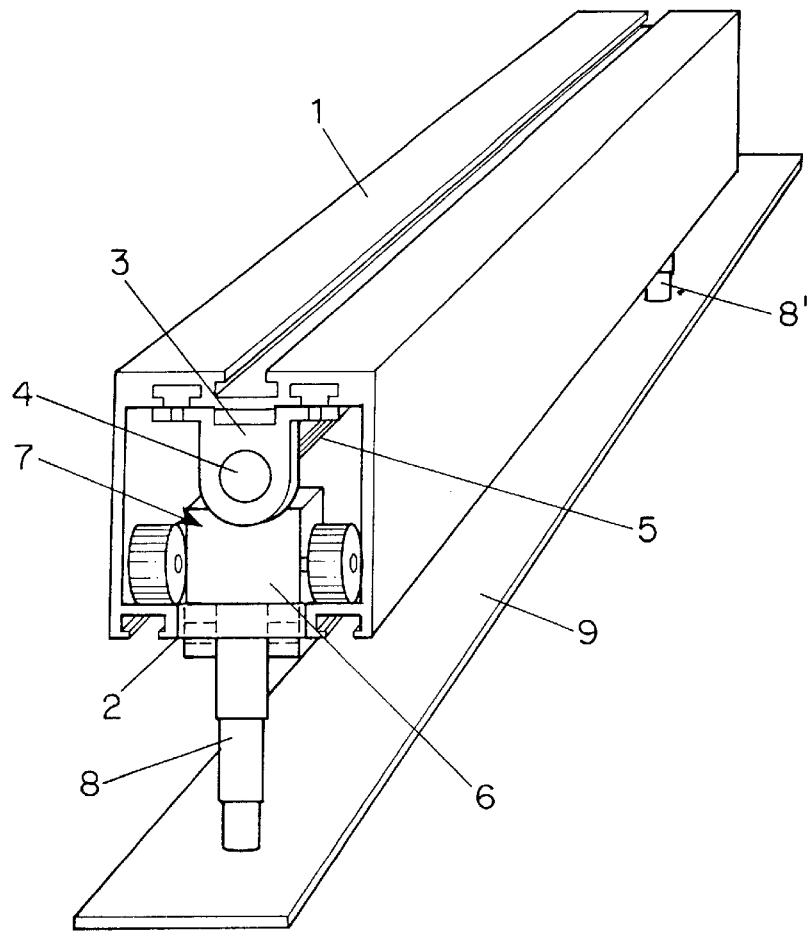
FIG. 1 shows in perspective a portion of the conveyor according to the invention.

FIG. 1 shows schematically a perspective view of a section of the conveyor according to the invention. The conveyor incorporates an elongated beam 1, which is made as a hollow box beam with square cross section and with a longitudinal and centrally located slit-shaped opening 2 provided in the side facing downwards in mounted position. In the interior of the beam 1 are provided a number of drop hanger bearing brackets 3, which together, in a rotatable manner support a spindle 4, extending in the longitudinal direction of the beam. This spindle 4 is equipped with threaded portions 5, arranged at spindle rotation, to cooperate with a driving block 6 adapted to the thread of the spindle and fitted to a trolley 7 movable in the interior of and in the longitudinal direction of the beam. From the trolley 7 extends a depending arm 8, which projects through the slit-shaped opening 2, and which preferably together with a corresponding arm 8' on another movable trolley (not visible in the figure) supports a loading area 9 of appropriate type.

Figure 2A:
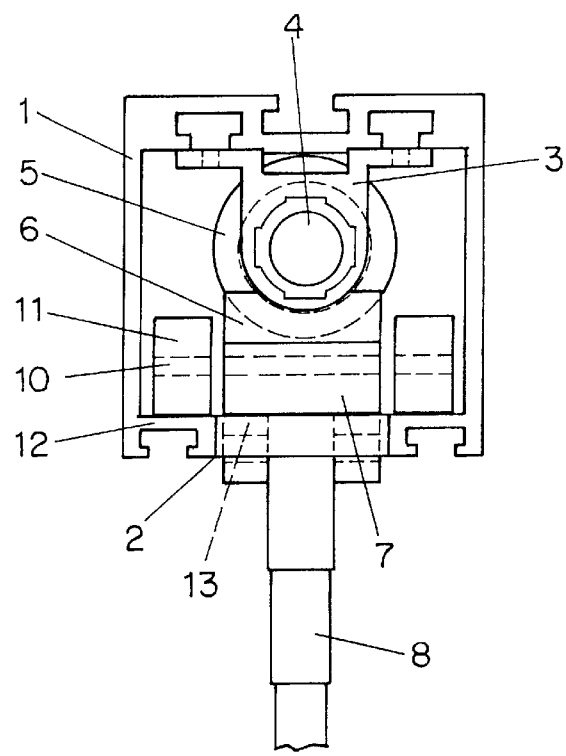
FIGS. 2a–2c show cross sectional views of a beam forming part of the conveyor and a part of a trolley movable therein, shown in different positions along the transport track.

FIG. 2a shows in cross section the substantially square hollow beam 1 with its longitudinal slit-shaped opening 2 in its lower surface, and with a spindle 4 mounted to rotate in bearing brackets 3 in the interior of the beam, which spindle via a center profile 4a supports threaded portions 5 by means of which the spindle 4 is in driving engagement with a driving block 6 on the trolley 7. The trolley is movable in the longitudinal direction of the beam, and carries a depending, load carrying arm 8 and is equipped with two transverse shafts 10 carrying wheels 11, arranged to roll on the flange shaped portions 12 of the beam situated on each side of the slit-formed opening 2 in the lower side of the beam 1, which portions thereby act as race tracks for these wheels.

Figure 2B:
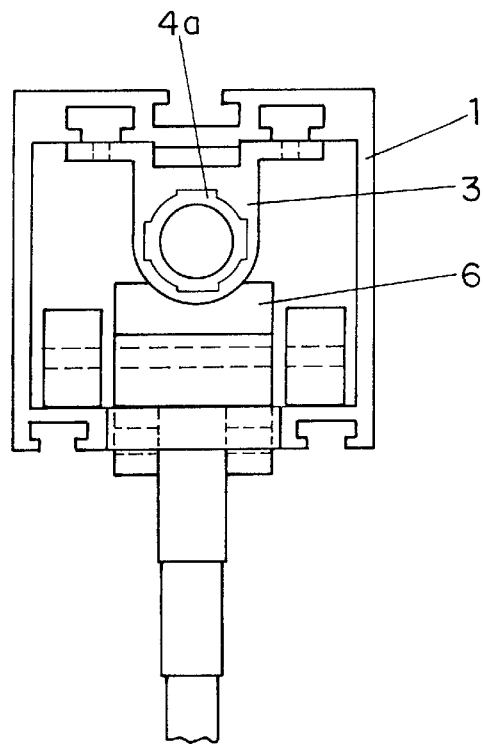

FIG. 2b shows a cross section taken at a distance from the view according to FIG. 2a and here the threaded portion 5 is missing and the spindle 4 carries the center profile 4a only, which is provided with external grooves and ridges, for giving a safe transfer of the spindle rotation to the threaded portions 5.

Figure 3:
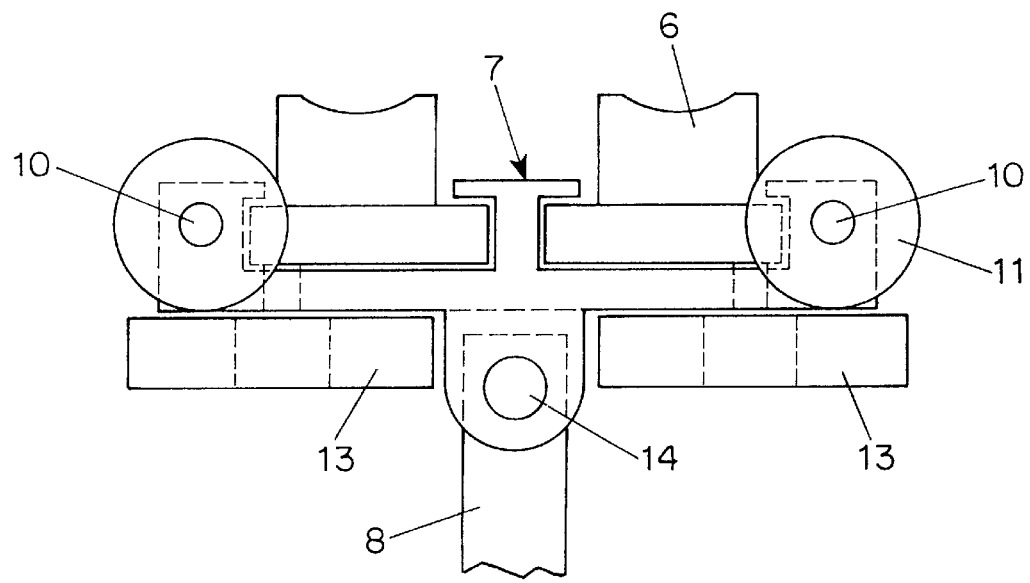
FIG. 3 shows the movable trolley in a side view.
Figure 2C:
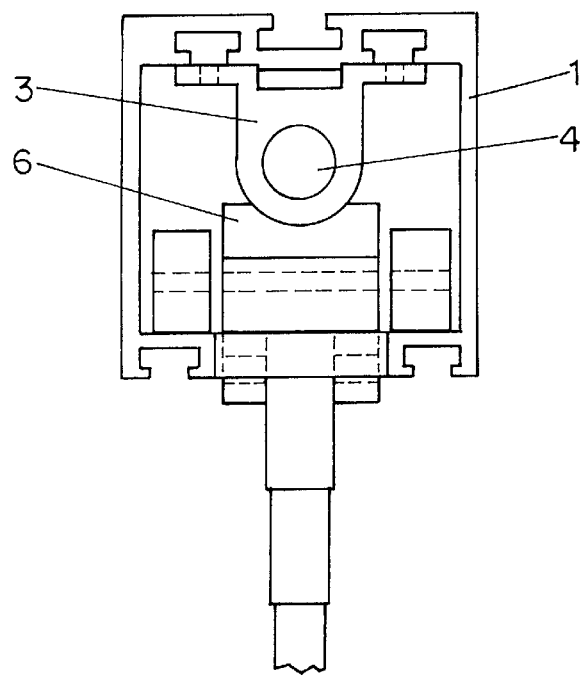

In FIG. 2c is shown in a corresponding cross section a portion where the spindle 4 is missing the center profile, and which portion, as will be elucidated later on, occurs at a switching position. In FIGS. 2a–c, only one of the two transverse shafts 10 of the trolley is visible. From FIG. 3, which shows the movable trolley in side elevation, it is clearly visible how the trolley 7 has two spaced apart transverse shafts 10 with wheels 11. Between the wheels 11 in the different pairs, there are arranged guiding means in the form of guide rollers 13 directed downwards and having a width somewhat smaller than the width of the slit-shaped opening 2 in the beam 1. These guide rollers 13, which project down through the opening, ensures that the trolley 7, when driven by the spindle, is safely guided in longitudinal direction without tendencies of misalignment and locking due to the "drawer-effect". As can be seen from this view, the arm 8 is journalled about a shaft 14, which is provided in a bracket, and about which it can make pendulum motions when needed.

Figure 4:
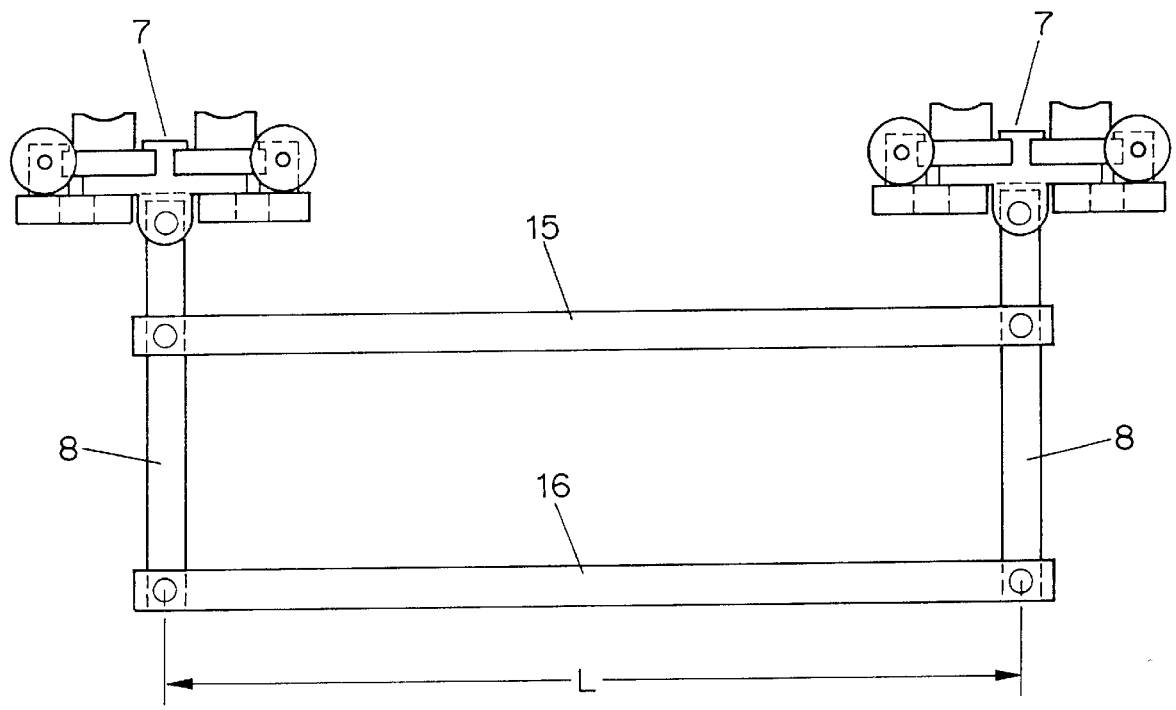
FIG. 4 illustrates likewise from the side two movable trolleys interconnected to a transport unit.

As can be seen from FIG. 4 two movable trolleys 7 are interconnected with a fixed mutual spacing L. In the embodiment shown, between the arms 8 on each trolley, are arranged articulately fitted connecting members 15, 16. In this manner the distance L between the two movable trolleys 7, which are interconnected to a unit, will always be the same, which is an important detail for the function of the conveyor, which will be evident from the following description.

Figure 5:
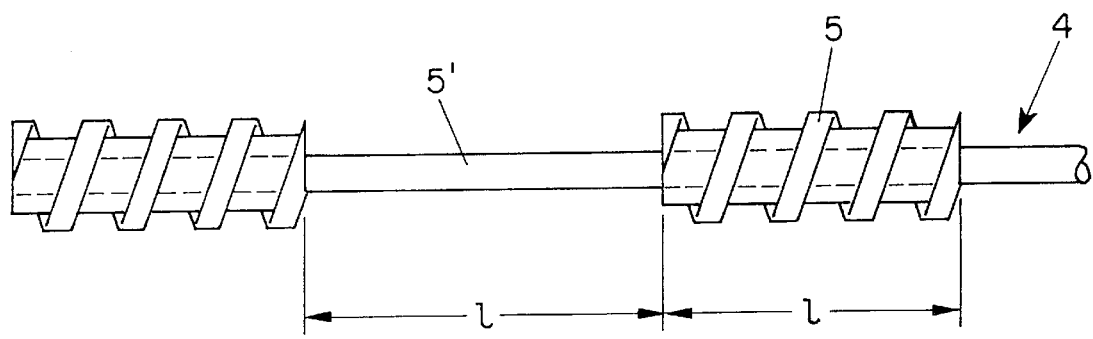
FIG. 5 shows a portion of a spindle forming part of the conveyor according to the invention.

FIG. 5 shows a portion of the spindle 4 incorporated in the conveyor device according to the invention, and as can be seen, this spindle is equipped with alternating threaded portions 5, and nonthreaded, smooth portions, which are constituted by center profile 4a or spindle 4. Each of the threaded portions 5 have a length l, somewhat exceeding the distance L between the movable trolleys 7 in the same unit, and preferably, each one of the nonthreaded portions 5' have a length l', which is substantially equal to the length l of the threaded portions. It should be noticed that the length l' may not be bigger than the length l, but it may however be shorter.

Figure 6:
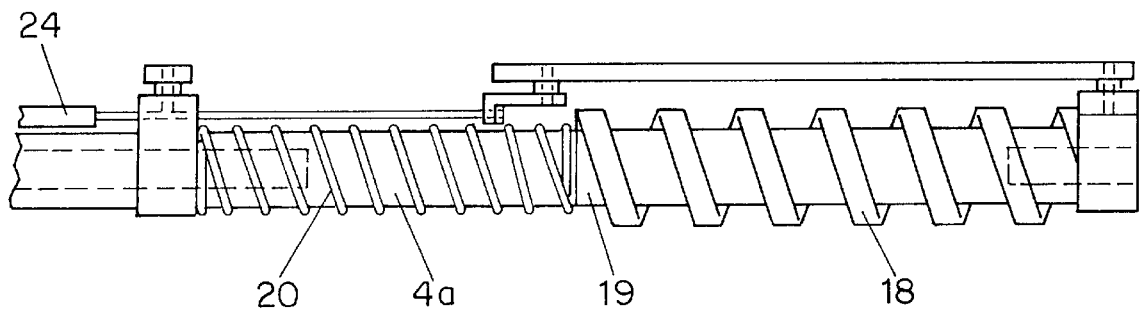
FIG. 6 shows a portion of the spindle forming part of the conveyor and having a movable section.

FIG. 6 shows in a partial side view, a portion of the spindle 4 equipped with a threaded portion 18, which is made as a cylindrical sleeve 19, surrounding the spindle and being axially displaceable along the spindle, which sleeve externally is provided with a thread, intended to be able to transfer the rotational motion of the spindle to a motion driving the movable trolley. By means of a spring 20 or the like, the sleeve 19 is pretensioned in a direction towards the operating position, but as stated above, it can be displaced axially against the action of the spring 20 to a position where its distance to the next threaded portion is bigger or smaller than the distance l, and thereby other than the distance between two trolleys interconnected to a unit.

Figure 7:
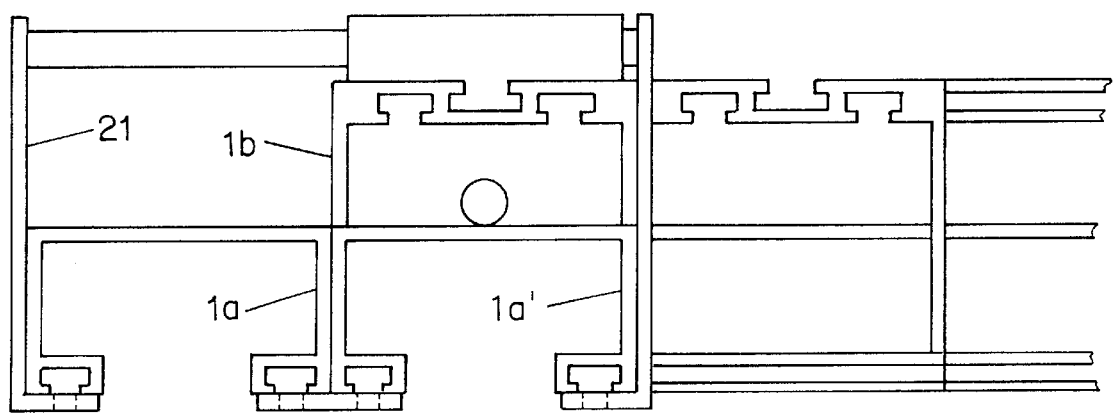
FIG. 7 illustrates in an end view a part of the convewyor beam system intended for switching from the main track of the conveyor and into a side track.

FIG. 7 shows schematically how a switching device for the conveyor device according to the invention can be accomplished in a simple and rational manner.

As the driving spindle 4 of the conveyor device is arranged to be situated in the upper half of the beam 1 above the trolleys propelled thereby, this beam in one portion can be split along a horizontal plane, whereby in this portion the lower beam part 1a is made double, with two-lower beam parts arranged in parallel, one of which, e.g. 1a, continues in the main direction of the upper beam part 1b, and one of which, e.g. 1a', is curved laterally away from said main direction for the upper beam part 1b. By displacing the lower beam halves 1a, 1a' laterally it is thereby possible to switch in the trolleys rolling on the lower flanges of the lower beam half on (not shown) branch tracks, where the driving of the trolley is taken over by a (not shown) spindle, which extends in the curved longitudinal direction of the branched off lower beam part 1a'.

Figure 8:
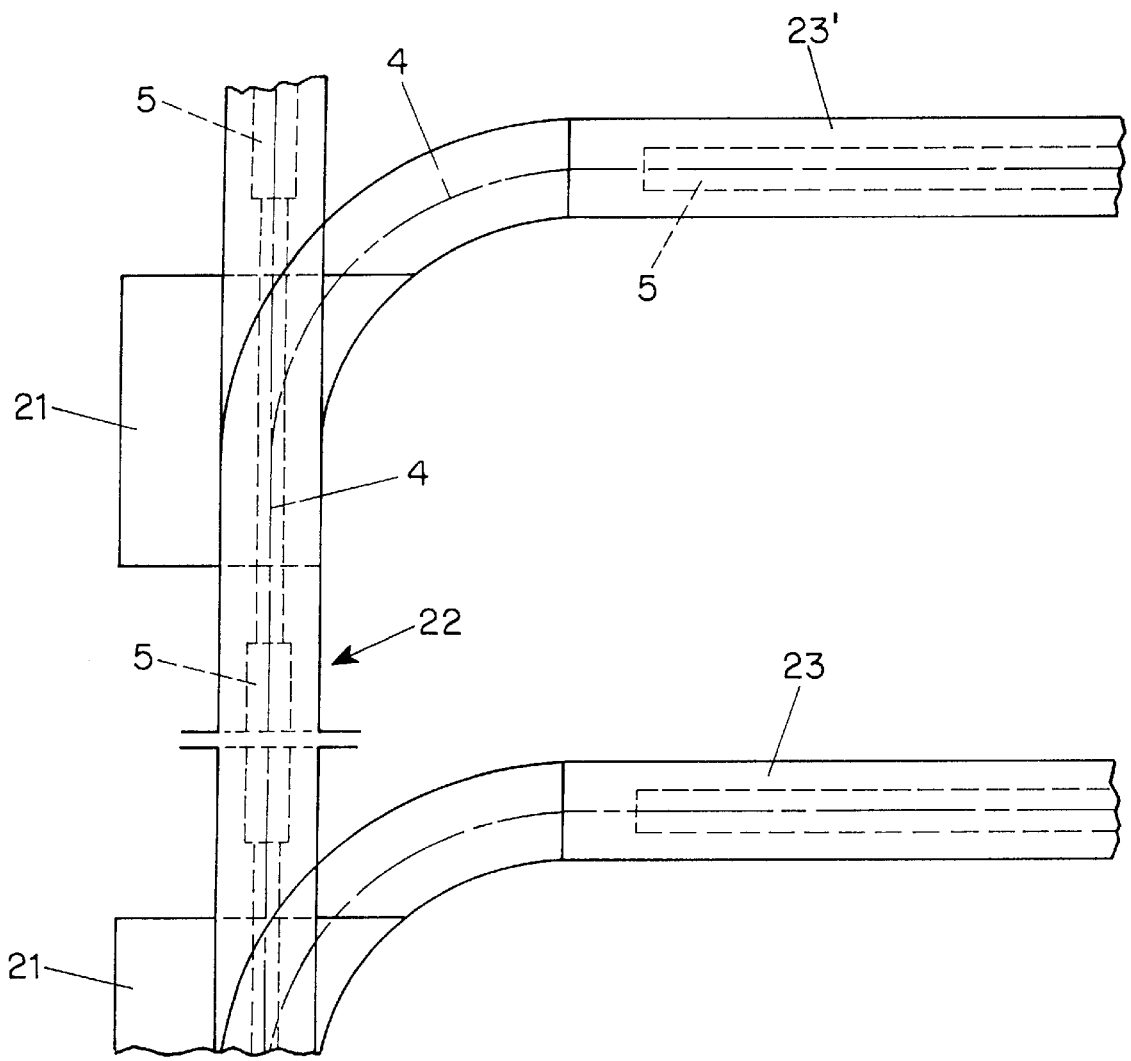
FIG. 8 is a schematic view from above and showing a track route with switching points and branched of track portions.

FIG. 8 shows in a schematic view from above, a conveyor track for a conveyor according to the invention, whereby the track incorporates a substantially rectilinear track part 22, with two branched off side tracks 23, 23', each of which is provided with a switching device according to FIG. 7, which is generally designated 21. Along the main extension 22, the spindle in the main beam has threaded portions 5, whereas it in the area of the switching devices has smooth, non-threaded spindle portions 4, i.e. non-driven sections. Along the entire branched off curved sections, the spindle is non-driving, and the length of the these non-driven curved sections correspond to the distance L. By means of this overhead spindle 4 with its alternating driving sections 5 and non-driving sections, it is possible with the configuration shown, to arrange the extension of the conveyor track also in rather shaft curves, and at the same time, it is possible with the switching device shown in FIG. 7 to carry through switching of a conveyor trolley unit incorporating two interconnected trolleys 7 to the right as well as to another branch track extending to the left in FIG. 7, a the same time as the trolley unit can be brought to travel on straight ahead.

Figure 9:
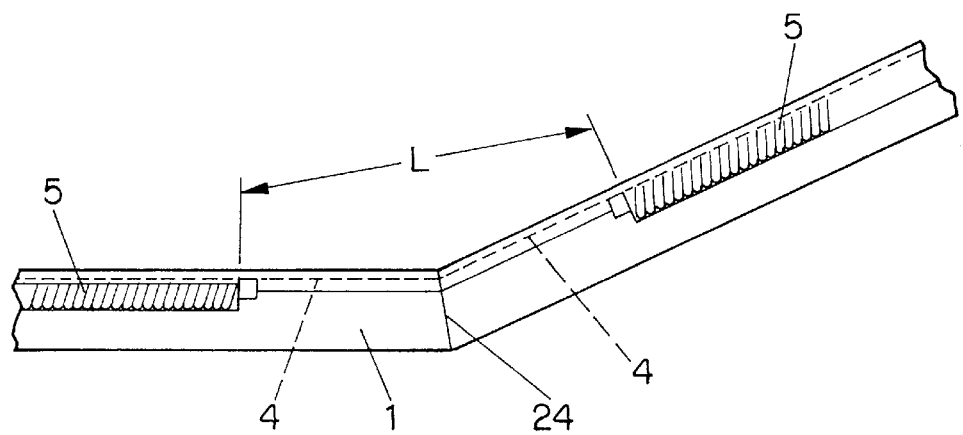
FIG. 9 illustrates schematically the arrangement of a level change for the track of the suspended conveyor.

FIG. 9 shows schematically how the conveyor track according to the invention can be angled upwards, in that the beam 1 somewhere along a nonthreaded portion 4 of the spindle, is provided with a bend, whereby the portions of the spindle, angled relative to each other, are interconnected by means of a ball joint 24 or the like. The length of the nonthreaded portion at most is somewhat shorter than the distance between two interconnected movable trolleys. The same possibility for angling downwards and laterally can of course be obtained in similar manner.

The conveyor device according to the invention operates in the following manner:

When the spindle 4 arranged in the beam 1 is brought to rotate, by means of a not shown driving device in a manner known per se, the trolley 7 with its driving block 6, will be carried along by the spindle 4 by means of the thread in a threaded section 5. Thereby, the forward trolley 7 of each unit, as seen in the direction of travel, will be carried along by the thread in a threaded section 5. The forward trolley 7 will be "pulled" forward, whereas the rear trolley will be situated along a nonthreaded, smooth section 5a. When the forward trolley thereupon just passes from the threaded section 5 to the smooth section 5', the rear trolley of the pair will just will enter the same threaded section 5, whereby the rear trolley and the forward trolley connected thereto as a unit will be "pushed" forward, until the rear trolley has reached the end of the threaded section. At the same time as this occurs, the forward trolley has reached the next threaded section and will therefore be in driving threaded engagement with this section. As the distance L between the trolleys 7 in each unit substantially corresponds to the length l of the threaded section 5 and of the nonthreaded section 5', in this manner is obtained a continuous driving of the conveyor trolley unit along the entire extension of the conveyor track.

When switching from a track section to a branch section, the overhead spindle and the alternating threaded and non-threaded, i.e. driving and non-driving sections 5 and 4 respectively, will enable the horizontally split beam at displacement of the lower portion 1a, to move the trolley 7 situated therein from its position under the first, straight beam part 1b, to the adjacent, curved beam part 1b', as the spindle 4 is not in driving engagement with the driving block 6 of the movable trolley in this section.

With the solution illustrated in FIG. 6, where the threaded portion 18 is movably arranged on the center profile 4a of the spindle, against the action of a pressure spring 20, and where the threaded section can be moved by means of a force cylinder 24, it is possible to move the consecutive driving sections thus that the distance between them can be caused to be temporarily shorter or possibly longer than the distance between two consecutive interconnected trolleys. In this manner, two consecutive interconnected trolleys in this area simultaneously will be disengaged from driving, threaded sections, which means that such displacement of a thread-provided section 5, 18 can cause the unit consisting of two movable trolleys to stop along the track although the spindle is still rotating, which means that other trolley units during the time are moved in other areas of the conveyor track. In order to re-start the trolley unit thus halted, the power cylinder is simply relieved, such that the threaded section by means of the spring is moved back to its normal driving position.

The invention is not limited to the embodiments shown in the drawings and described in connection thereto, but modifications and variations are possible within the scope of the following claims.

I claim:

1. A suspended conveyor system comprising
   (a) a track for supporting one or more trolley members and defining a path of travel for the trolley members;
   (b) a rotatable drive spindle extending along the path of travel for driving trolley members along the path of travel, said drive spindle being threaded along a portion of its length; and (c) at least one trolley member supported by the track, said trolley member comprising two subunits each comprising a drive section coupled to the threaded portion of the drive spindle for movement of the trolley member along the path of travel, and a pair of wheels bearing on the track and allowing the trolley member to roll along the track, wherein said subunits are coupled one in front of the other along the path of travel and are separated one from the other by a distance L;

wherein the drive spindle has at least one alternating region in which there are alternating threaded regions having a length l which is the same as or greater than the distance L and non-threaded regions having a length l' which is the same as or less than the distance L, whereby the drive section of one subunit of a trolley member within the alternating region is in driving engagement with a threaded region while the drive section of the other subunit travels on a non-threaded region.

2. The suspended conveyor system of claim 1, wherein the drive spindle is disposed above the track for supporting trolley members, and above the trolley members.

3. The suspended conveyor system of claim 2, wherein each of the subunits further comprises an arm suspended below the track, and wherein each trolley member further comprises a loading member interconnecting the arms of the subunit of the trolley member.

4. The suspended conveyor system of claim 3, wherein the track comprises a box beam having a hollow interior and a slit formed in the bottom side thereof to provide access to the interior of the box beam, the wheels bear on the inner surface of the bottom side of the box beam on either side of the slit, the drive spindle is disposed within the interior of the box beam, and the trolley members are movable within the interior of the box beam.

5. The suspended conveyor system of claim 4, wherein the hollow box beam includes a switching section having tracks for a main track and a branch track running within the section, said switching section having an alternating region of the drive spindle disposed in an upper part of the interior of the box beam, the trolley members are disposed in a lower part of the interior of the box beam, further comprising a switching device for switching a trolley member within the switching section between the main track and the branch track.

6. The suspended conveyor system of claim 5, wherein the switching device comprises a steering member disposed in alignment with a non-threaded portion of the drive spindle for laterally displacing a trolley member between the main track and the branch track.

7. The suspended conveyor system of claim 6, wherein at least one threaded portion within the alternating region is axially displaceable relative to the spindle for temporarily increasing the length of an adjacent non-threaded region to be greater than the distance L, whereby a trolley member can be selectively stopped on the conveyor.

8. The suspended conveyor system of claim 1, wherein each of the subunits further comprises an arm suspended below the track, and wherein each trolley member further comprises a loading member interconnecting the arms of the subunit of the trolley member.

9. The suspended conveyor system of claim 8, wherein the track comprises a box beam having a hollow interior and a slit formed in the bottom side thereof to provide access to the interior of the box beam, the wheels bear on the inner surface of the bottom side of the box beam on either side of the slit, the drive spindle is disposed within the interior of the box beam, and the trolley members are movable within the interior of the box beam.

10. The suspended conveyor system of claim 9, wherein the hollow box beam includes a switching section having tracks for a main track and a branch track running within the section, said switching section having an alternating region of the drive spindle disposed in an upper part of the interior of the box beam, the trolley members are disposed in a lower part of the interior of the box beam, further comprising a switching device for switching a trolley member within the switching section between the main track and the branch track.

11. The suspended conveyor system of claim 10, wherein the switching device comprises a steering member disposed in alignment with a non-threaded portion of the drive spindle for laterally displacing a trolley member between the main track and the branch track.

12. The suspended conveyor system of claim 11, wherein at least one threaded portion within the alternating region is axially displaceable relative to the spindle for temporarily increasing the length of an adjacent non-threaded region to be greater than the distance L, whereby a trolley member can be selectively stopped on the conveyor.

13. The suspended conveyor system of claim 1, wherein the track comprises a box beam having a hollow interior and a slit formed in the bottom side thereof to provide access to the interior of the box beam, the wheels bear on the inner surface of the bottom side of the box beam on either side of the slit, the drive spindle is disposed within the interior of the box beam, and the trolley members are movable within the interior of the box beam.

14. The suspended conveyor system of claim 13, wherein the hollow box beam includes a switching section having tracks for a main track and a branch track running within the section, said switching section having an alternating region of the drive spindle disposed in an upper part of the interior of the box beam, the trolley members are disposed in a lower part of the interior of the box beam, further comprising a switching device for switching a trolley member within the switching section between the main track and the branch track.

15. The suspended conveyor system of claim 14, wherein the switching device comprises a steering member disposed in alignment with a non-threaded portion of the drive spindle for laterally displacing a trolley member between the main track and the branch track.

16. The suspended conveyor system of claim 15, wherein at least one threaded portion within the alternating region is axially displaceable relative to the spindle for temporarily increasing the length of an adjacent non-threaded region to be greater than the distance L, whereby a trolley member can be selectively stopped on the conveyor.

17. The suspended conveyor system of claim 1, wherein the system includes a switching section having tracks for a main track and a branch track running within the section, said switching section having an alternating region of the drive spindle disposed in an upper part of the interior of the box beam, the trolley members are disposed in a lower part of the interior of the box beam, further comprising a switching device for switching a trolley member within the switching section between the main track and the branch track.

18. The suspended conveyor system of claim 17, wherein the switching device comprises a steering member disposed in alignment with a non-threaded portion of the drive spindle for laterally displacing a trolley member between the main track and the branch track.

19. The suspended conveyor of claim 18, wherein at least one threaded portion within the alternating region is axially displaceable relative to the spindle for temporarily increasing the length of an adjacent non-threaded region to be greater than the distance L, whereby a trolley member can be selectively stopped on the conveyor.

20. The suspended conveyor system of claim 1, wherein at least one threaded portion within the alternating region is axially displaceable relative to the spindle for temporarily increasing the length of an adjacent non-threaded region to be greater than the distance L, whereby a trolley member can be selectively stopped on the conveyor.

21. A method for transporting an article on a suspended conveyor comprising a track for supporting one or more trolley members and defining a path of travel for the trolley members; a rotatable drive spindle extending along the path of travel for driving trolley members along the path of travel, said drive spindle being threaded along a portion of its length; and a trolley member supported by the track, said trolley member comprising two subunits each comprising a drive section coupled to the threaded portion of the drive spindle for movement of the trolley member along the path of travel, and a pair of wheels bearing on the track and allowing the trolley member to roll along the track, wherein said subunits are coupled one in front of the other along the path of travel and are separated one from the other by a distance L, wherein the drive spindle has at least one alternating region in which there are alternating threaded regions having a length l which is the same as or greater than the distance L and non-threaded regions having a length l' which is the same as or less than the distance L, whereby the drive section of one subunit of a trolley member within the alternating region is in driving engagement with a threaded region while the drive section of the other subunit travels on a non-threaded region, comprising the steps of affixing the article to the trolley member; and moving the trolley member along the track by rotating the drive spindle.

* * * * *

UNITED STATES PATENT AND TRADEMARK OFFICE
CERTIFICATE OF CORRECTION

PATENT NO : 5,829,356
DATED : November 3, 1998
INVENTOR(S) : Carsten Christiansson It is certified that error appears in the above-identified patent and that said Letters Patent are hereby corrected as shown below:

On the cover page, Line [63], "Mar. 23, 1998" should read -- Mar. 23, 1995--.

Signed and Sealed this

Ninth Day of March, 1999

*Attest:*

*Attesting Officer*

Q. TODD DICKINSON

*Acting Commissioner of Patents and Trademarks*